No. 889,039. PATENTED MAY 26, 1908.
A. PERIS.
PERCH FOR FOWLS.
APPLICATION FILED DEC. 14, 1906.
2 SHEETS—SHEET 1.
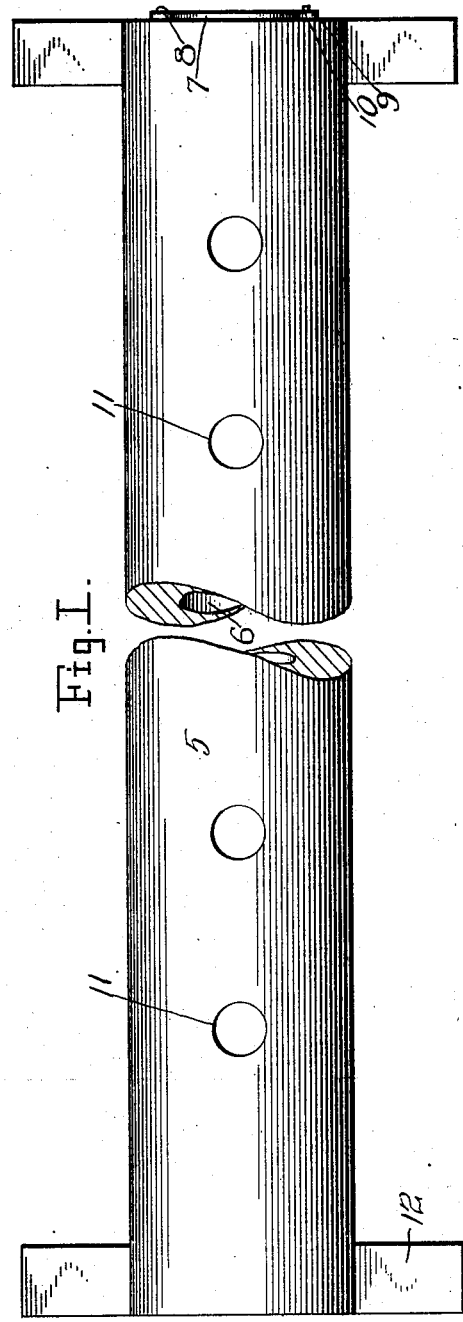
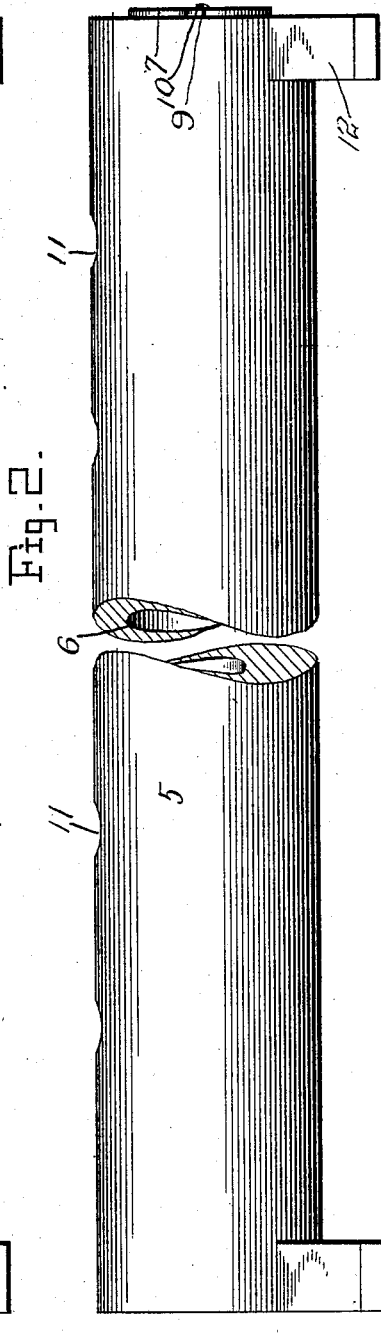

No. 889,039.
PATENTED MAY 26, 1908.
A. PERIS.
PERCH FOR FOWLS.
APPLICATION FILED DEC. 14, 1906.
2 SHEETS—SHEET 2.
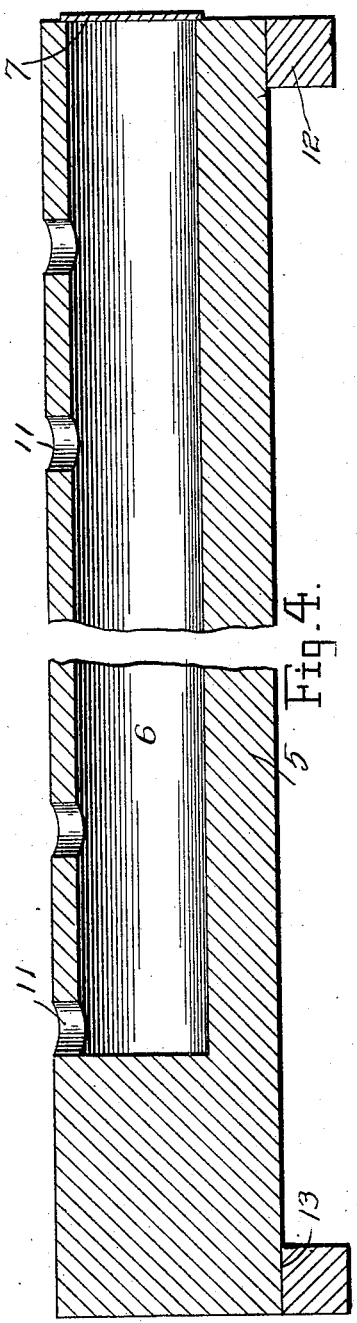
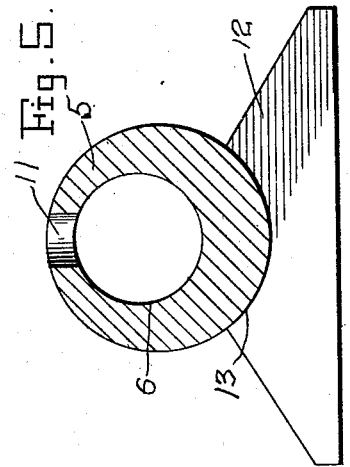
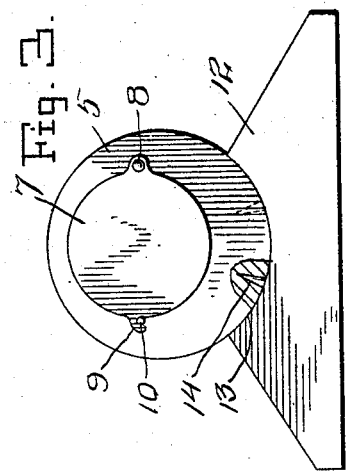

UNITED STATES PATENT OFFICE.

ADOLPHUS PERIS, OF WESTWOOD, NEW JERSEY.

PERCH FOR FOWLS.

No. 889,039.  Specification of Letters Patent.  Patented May 26, 1908.

Application filed December 14, 1906. Serial No. 347,799.

*To all whom it may concern:*

Be it known that I, ADOLPHUS PERIS, a citizen of the United States, residing at Westwood, in the county of Bergen, State of New Jersey, have invented certain new and useful Improvements in Perches for Fowls; and I do hereby declare the following to be a full, clear, and exact description of the invention, such as will enable others skilled in the art to which it appertains to make and use the same.

This invention relates to perches for poultry, and more particularly to that class which are designed for the reception of fumigating compounds which will serve to destroy any insects which may be upon the fowls.

It is the object of my invention to so construct the perch as to bring the receptacle for the insecticide near the upper side of the perch where the fowls sit, and to provide apertures in the perch communicating directly with the said receptacle opening through the top, so that the roosting fowls may receive the full benefit of the compound or substance in the receptacle.

The nature of the invention is fully and clearly ascertainable from the device portrayed in the annexed drawings, forming a part of this specification, in view of which it will first be described with respect to its construction and mode of use and then be pointed out in the subjoined claims.

Of the accompanying drawings: Figure 1 is a plan of my invention, Fig. 2 is a side elevation thereof, Fig. 3 is an end view, Fig. 4 is a detail vertical longitudinal sectional view, and, Fig. 5 is a detail vertical, transverse sectional view taken in a line with one of the openings in the perch.

Referring more specifically to the drawings, the perch is shown as comprising a pole 5 in which is formed a longitudinally extending bore 6, the said bore being terminated short of one end of the pole and opening through the opposite end thereof and positioned eccentrically with respect to the pole. The bore is adapted to be closed at its open end, however, by means of a disk closure 7 which is pivoted as at 8 by means of a screw to the said end of the pole 5. The disk closure 7 is provided with a notched tongue 9 which, when the disk is swung to close the bore, engages a pin 10 carried by the said end of the pole and at a point diametrically opposite the pivot screw 8.

Formed in the pole and opening through the upper side thereof are openings 11 which communicate with the bore, it being understood that some suitable insecticide is introduced into the bore 6 and emits its fumes through the openings 11.

The eccentric location of the bore 6 is such as to bring it as near as is practicable to the line where the bodies of the fowls rest when roosting on the perch, in order that the warmth of the bodies will excite the fumigant, and so also that the bodies of the fowls may be brought near the said fumigant. It is necessary that the perch should be relatively large in order that it shall have the requisite strength, while the bore 6 which forms the receptacle for the insecticide should be comparatively small, hence the reason for the eccentric location of the bore, as before explained. It may be added, further, that in order to bring the longitudinal bore of the perch as near to the bodies of the roosting fowls as possible, the said bore is made to most nearly approach the circumference of the perch along the top line of the latter, and the holes 11 open into said bore along the said top line. This construction, to which my invention is confined, is most important, as hereinbefore indicated, in order that the fumigant may be effective in reaching the purpose aimed at.

My invention also includes a novel means for supporting the perch in such a manner that it may be readily taken down to be cleaned and refilled, the said means serving, however, to hold it securely in position against accidental disengagement, and this means consists of a pair of brackets 12 which are nailed or otherwise secured to any suitable support and which are cut away as at 13 for the reception of one end of the pole 5, there being spurs 14 projecting upwardly from the brackets in their cut-away portions to bite into the pole 5, it being understood that the ends of the pole are tapped with a hammer to cause such biting action. It will be understood, however, that while these spurs prevent dismounting of the pole due to movements of the fowls, they are not sufficiently strong to prevent the pole being manually dismounted.

In all cases the ends of the perch will be fixed in position so that the holes 11, that open through to the bore 6, will always be on the top of the perch.

What is claimed is:—

A device of the type set forth, comprising a pair of brackets having concave bearing seats and provided with spurs projecting upwardly from said seats in convergent relation and a perch having a curved face for engagement with said concave bearing seats, said spurs being adapted to bite into the material of said perch.

In testimony whereof, I affix my signature, in presence of two witnesses.

ADOLPHUS PERIS.

Witnesses:
EDWARD BLAUVELT,
ALBERT PERIS.